(12) United States Patent  
Kaaden

(10) Patent No.: US 6,574,064 B1  
(45) Date of Patent: Jun. 3, 2003

(54) TAPE RECORDER

(75) Inventor: Jürgen Kaaden, Villingen-Schwenningen (DE)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/168,140

(22) Filed: Oct. 7, 1998

(30) Foreign Application Priority Data

Oct. 28, 1997 (DE) .......................................... 197 47 493

(51) Int. Cl.⁷ .......................... G11B 15/18; G11B 15/48; G11B 5/584
(52) U.S. Cl. .................... 360/72.1; 360/74.6; 360/77.12
(58) Field of Search .......................... 360/75, 71, 72.1, 360/72.2, 74.1, 74.6, 74.4, 77.12, 48; 369/30.1, 97

(56) References Cited

U.S. PATENT DOCUMENTS

| | | | | |
|---|---|---|---|---|
| 3,769,465 A | * | 10/1973 | Wellbrock | 360/77.12 X |
| 5,485,321 A | * | 1/1996 | Leonhardt et al. | 360/72.2 X |
| 5,566,033 A | * | 10/1996 | Frame et al. | 360/74.6 |
| 6,018,434 A | * | 1/2000 | Saliba | 360/74.6 X |
| 6,031,698 A | * | 2/2000 | Bar | 360/72.2 X |
| 6,067,213 A | * | 5/2000 | Oldermann et al. | 360/130.2 X |

FOREIGN PATENT DOCUMENTS

| | | |
|---|---|---|
| DE | 19522009 | 1/1997 |
| DE | 19522009 A1 | 1/1997 |

OTHER PUBLICATIONS

German Search Report dated Feb. 17, 1998 for corresponding German Patent Appln. No. 197 47 493.4.

* cited by examiner

Primary Examiner—Andrew L. Sniezek  
(74) Attorney, Agent, or Firm—Joseph S. Tripoli; Harvey D. Fried; Francis A. Davenport

(57) ABSTRACT

A tape recorder, having a reading device for a magnetic tape, is set up to read out simultaneously a number of data tracks recorded in parallel on the magnetic tape. Stored on the magnetic tape in the vertical direction relative to the data tracks is additional information which can be sensed as a whole in specific tape positions by the reading device. The additional information can contain information on the state of the tape. Such a tape recorder can read the information on the state of the tape immediately after the insertion of a magnetic tape cassette without the need for the magnetic tape to be transported to and fro.

8 Claims, 4 Drawing Sheets

TAPE RECORDER

FIELD OF THE INVENTION

The invention relates to a tape recorder, and proceeds from a tape recorder in accordance with the preamble of claim 1. A tape recorder is to be understood below as any device in which signals, data or information in analog and/or digital form are recorded on a magnetic tape and/or read from the latter. These devices can have yet further functions independently thereof, for example they can be combined with an electronic camera.

BACKGROUND OF THE INVENTION

The publication "Towards the Multitrack Digital Video Tape Recorder" by Francois Maurice in "The Magnetic Society of Japan" 1991, Volume 15, Pages 389 to 394 discloses a tape recorder in which a multiplicity of data and/or signal tracks are recorded on a magnetic tape using the method of longitudinal track recording. In the device disclosed in said printed publication, the data tracks are written simultaneously by means of a matrix head. In an exemplary embodiment of said device, up to 80 parallel tracks with a width of 7 µm are written without grass, that is to say without an interspace between the individual tracks. Owing to the large number of data tracks, it is possible to reduce the tape speed by a corresponding factor for a prescribed data rate to be recorded. On the one hand, a very high recording density is thereby achieved on the magnetic tape, while on the other hand, it is very difficult in practice to integrate in a reading unit many inductive heads situated close to one another. Consequently, to read the data use is made of a magneto-optic scanning device whose essential element is a magneto-optic transducer which utilizes the magneto-optic Kerr effect. The magneto-optic transducer is arranged transverse to the longitudinal extent of the magnetic tape and has a length which permits several data tracks to be read out simultaneously.

As in the case of all tape recorders, it is also necessary in this case for measures to be taken so that the user is given a display of the state of the tape. It is conventional for this purpose to record parallel to the data tracks a control track which is read by an additional inductive control head. In order to avoid the outlay on the additional control head, it is also known to store the information for orientation in the longitudinal direction of the magnetic tape in outer tracks of the track packet, and to read it out likewise via the magneto-optic transducer. This solution requires less outlay and, moreover, not only permits orientation in the longitudinal direction of the tape, but also renders it possible to utilize the edge tracks for positioning the write and/or read head. Common to both solutions, however, is that the magnetic tape must be transported at least a short distance in the longitudinal direction in order to determine the current position of the magnetic tape. Although this operation proceeds automatically, it requires time and consumes energy, and this is a disadvantage, particularly in the case of battery-operated devices.

SUMMARY OF THE INVENTION

Starting from this point, it is the object of the invention to create a tape recorder in which the current tape position of a newly inserted cassette is displayed without the need to transport the magnetic tape in the longitudinal direction.

This object is achieved by means of a tape recorder which is characterized in that the reading device is suitable for detecting additional information stored on the magnetic tape in the vertical direction.

This tape recorder renders it possible for information to be read from the magnetic tape without the need for transportation in the longitudinal direction for this purpose.

The reading unit advantageously has a magneto-optic transducer which is constructed so that it can simultaneously sense a number of parallel data tracks. The magneto-optic transducer can expediently have a length such that in specific positions on the magnetic tape all the additional information stored thereon in the vertical direction can be sensed. It is particularly expedient if the additional information contains the information on the state of the tape.

In an expedient development of the invention, the tape recorder has a drive device for the magnetic tape, which is controlled by a control unit. The control unit receives from the reading device a control signal which indicates when the magneto-optic transducer senses the additional information. In a development of the invention, said control signal can be used so that the drive device of the magnetic tape stops only in the positions in which the reading device senses the additional information. It is ensured in this way that a magnetic tape can be removed only in a position in which it is possible that when the tape is reinserted the additional information can be read by the magneto-optic transducer without the need to transport the tape in the longitudinal direction. It is advantageous for the spools in a cassette to be locked by latching means upon removal from the tape recorder. When the cassette is inserted into the tape recorder, actuating means can disengage the latching means again.

The invention further relates to a method for writing and/or reading signals or data onto or from a magnetic tape. The invention proceeds from a method in which data are recorded on a magnetic tape in data tracks arranged in parallel, and in which, moreover, additional information are recorded which specify the tape position.

Such methods are known from the prior art, but they all without exception require the magnetic tape to be transported at least a short distance in the longitudinal direction.

Starting from this, it is a further object of the invention to specify a method in which additional information is stored on the magnetic tape in such a way that the information on the state of the tape can be read off without the need to transport the magnetic tape.

This object is achieved by means of a method which is characterized in that additional information is stored perpendicular to the data tracks recorded in longitudinal tracks.

In accordance with an exemplary embodiment of the method according to the invention, portions of the additional information can be recorded inside different data tracks, the portions of the additional information which are contained in different data tracks being strongly correlated in the direction perpendicular to the data tracks.

The data are advantageously recorded as digital signals in the data tracks, there being sent in advance of the principal data pilot signals which serve to tune the reading unit before the principal data intended for further processing are read out. In this case, it is possible for the additional information to be stored in the spatial region on the magnetic tape which is occupied by the pilot signals in the individual data tracks. This has the advantage of excluding any type of interference between the principal data and the additional information.

Finally, the invention relates to a magnetic tape in which a multiplicity of parallel data tracks are recorded using the method of longitudinal track recording.

Such magnetic tapes are known in the prior art. However, they have the disadvantages described at the beginning in connection with displaying the state of the tape.

It is the object of the invention starting herefrom to create a magnetic tape in which the information on the state of the tape can be read off without the need to move the magnetic tape in the longitudinal direction.

This object is achieved by means of a magnetic tape which is characterized in that the additional information is recorded in the direction perpendicular to the data tracks.

In an expedient embodiment of the magnetic tape, the additional information can be strongly correlated perpendicular to the direction of the parallel data tracks.

BRIEF DESCRIPTION OF THE DRAWINGS

An exemplary embodiment of the tape recorder according to the invention is represented in the drawing, in which.

DETAILED DESCRIPTION OF PREFERRED EMBODIMENTS

Figure 1:
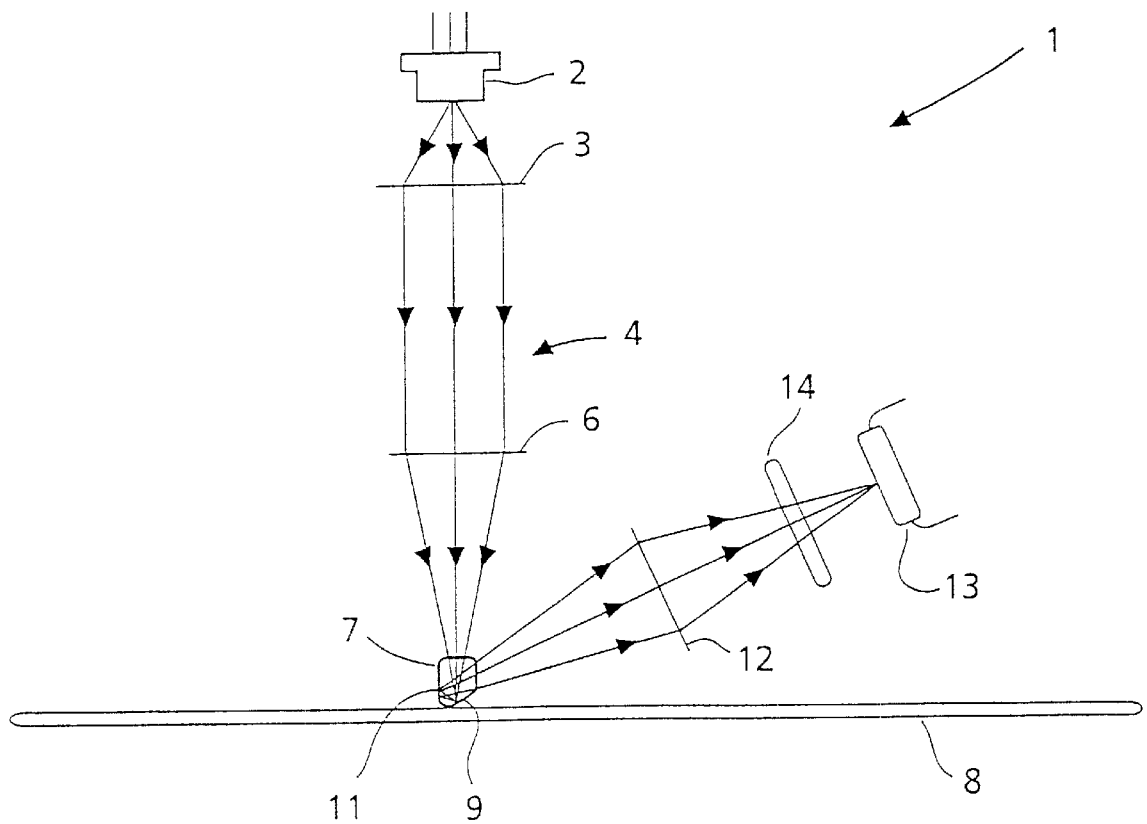
FIG. 1 shows a diagrammatic representation of the reading device for a magnetic tape.

FIG. 1 diagrammatically illustrates the reading unit, denoted as a whole by the reference numeral 1, of a tape recorder according to the invention. A laser diode 2 forms a divergent light source for linearly polarized light. The divergent light beams are focused by means of a convex lens 3 to form a parallel light bundle 4 which impinges on a cylindrical lens 6. The cylindrical lens 6 focuses the light bundle 4 onto one side of an elongated magneto-optic transducer 7, which touches a magnetic tape 8, to form a so-called line focus. The incoming light is reflected at the boundary surface 9 facing the magnetic tape 8. Because of the magneto-optic Kerr effect, the stray magnetic fields which are produced by the magnetization of the adjacent magnetic tape 8 have the effect that the polarization plane of the reflected light is simultaneously rotated by a specific angle with respect to the incoming light. After further reflection at a second boundary surface 11, the light emerges from the magneto-optic transducer 7 in a divergent fashion in another direction. The divergent beam is rendered convergent in a plane by means of a second cylindrical lens 12. The cylindrical lens 12 projects the line focus produced in this way onto a photosensor which is constructed as a linear CCD element 13. Arranged in the beam path between the second cylindrical lens 12 and the CCD element 13 is an analyser 14 which is set such that light whose polarization plane corresponds to that of the laser beam is passed. Consequently, the analyser 14 attenuates light beams whose polarization plane has been rotated by the magneto-optic Kerr effect upon reflection in the magneto-optic transducer 7.

The reading unit 1 is adjusted such that the light influenced by in each case one data track is projected onto a pixel of the CCD element 13. An alternating magnetization on the data track is converted in this way into a variation in the electric output signal of the CCD element 13. Said signal is converted by suitable circuit means into a digital electric signal.

Figure 4:
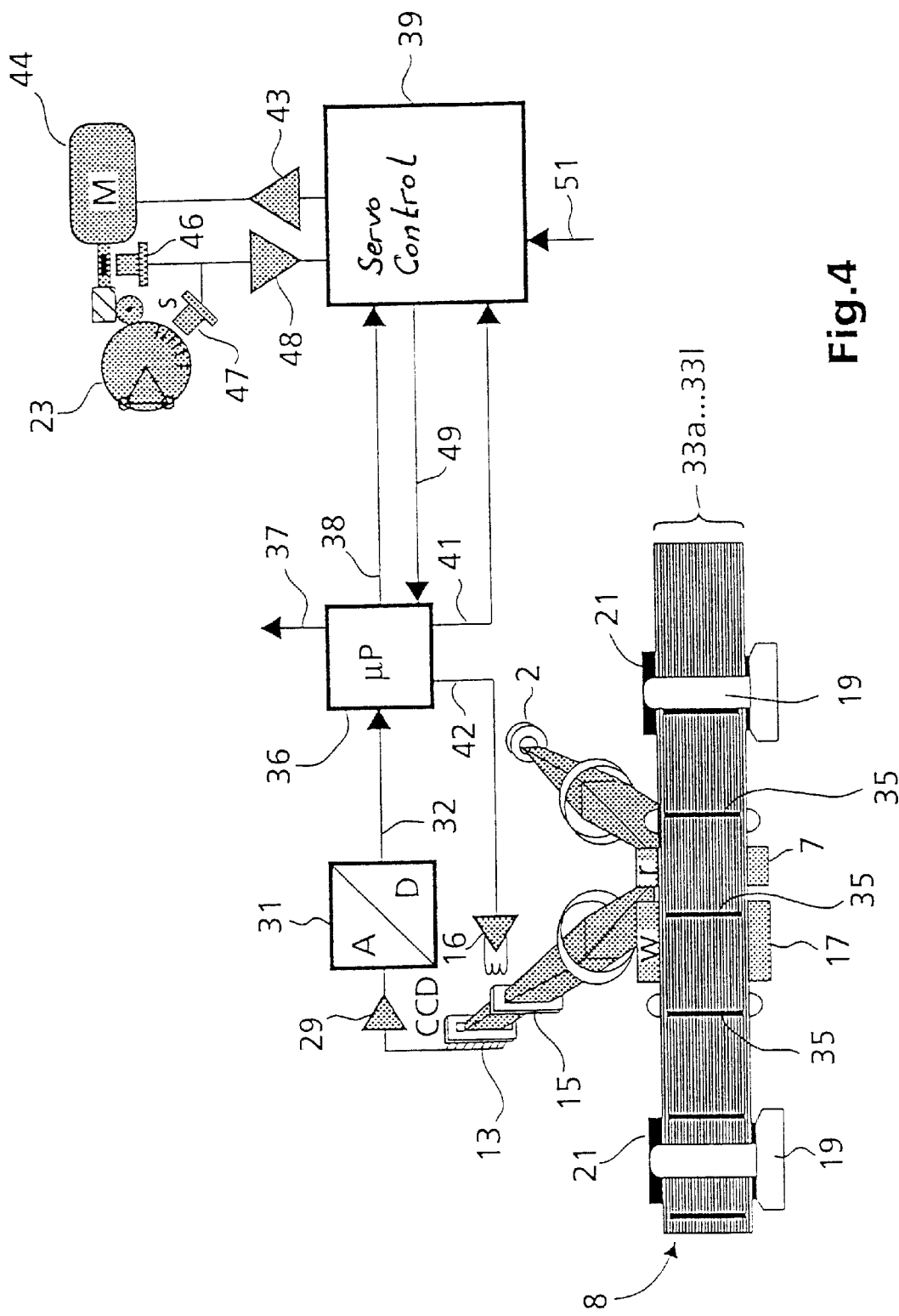
FIG. 4 shows a block diagram for illustrating the control of the tape recorder.

In order to ensure that no crosstalk takes place from a data track into a pixel of the CCD element 13 which is assigned to another data track, a track guidance plate 15 (FIG. 4) is provided in the beam path. The track guidance plate 15 comprises a plane-parallel transparent plate which can be moved to and fro in the beam direction by electromagnetic control means 16 (FIG. 4). The refractive index of the plate 15 is higher than that of air, with the result that the emerging light is offset in parallel with respect to the incoming light. The light impinging on the CCD element 13 can thus be displaced in the vertical direction by the to and fro movement of the track guidance plate 15.

Figure 2:
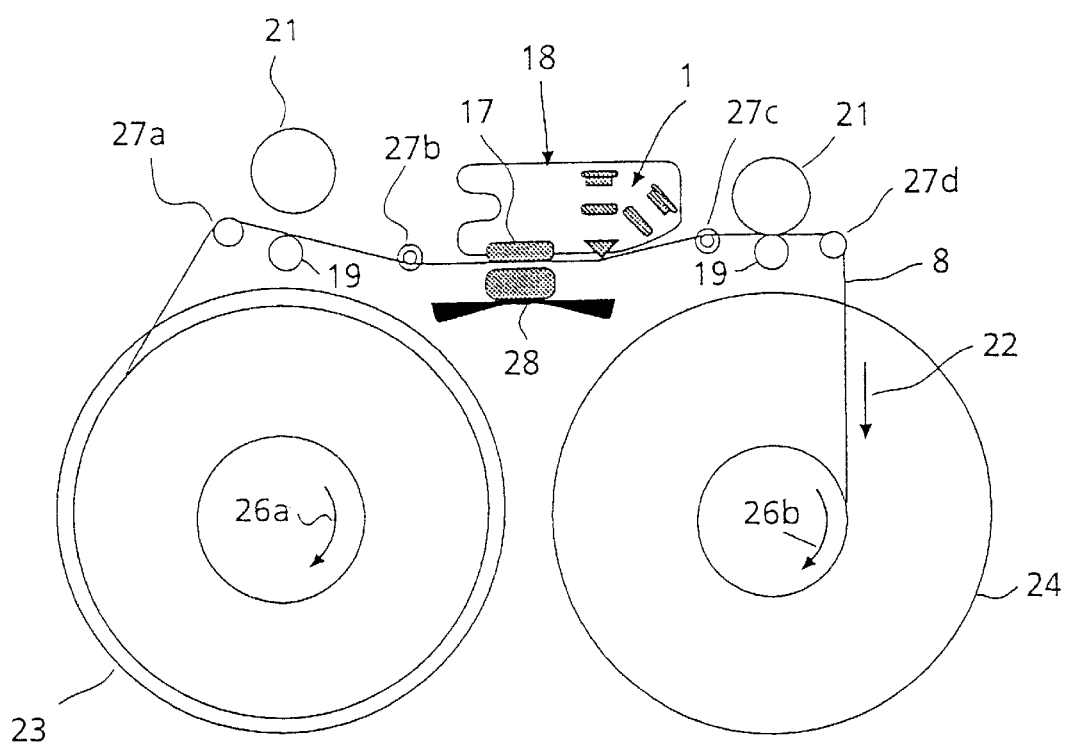
FIG. 2 shows a write/read unit with a cassette inserted.

In a practical exemplary embodiment of the invention, the reading unit is of compact design and combined together with a write head 17 (FIG. 2) to form a head unit 18 (FIG. 2).

FIG. 2 shows the head unit 18 in a tape recorder with a cassette inserted. For the sake of clarity, the housing of the cassette is left out of the representation. As in the case of known tape recorders, the magnetic tape 8 is driven by means of a capstan 19 in cooperation with a capstan idler 21, there being provided for the two transport directions of the magnetic tape 8 one drive arrangement each which has a capstan 19 and a capstan idler 21. The transport direction of the magnetic tape 8 is indicated in FIG. 2 by an arrow 22. The magnetic tape 8 is unwound from a spool 23 and wound onto a spool 24. The direction of rotation of the spools 23, 24 is indicated by arrows 26a, 26b. The capstan shafts 19 and the spools 23, 24 are driven in each case by a motor (not represented). Various guide rollers 27a . . . 27d provide correct guidance of the tape.

A pressure element 28 is arranged situated opposite the head unit 18 in such a way that in reproduction mode it is located at a specific distance from the magnetic tape 8. Said pressure element 28 is brought up to the magnetic tape 8 during writing of the magnetic tape 8, and presses the magnetic tape 8 against the write head 17 with a light pressure, in order to ensure the magnetic tape 8 is written acceptably. The pressure element 28 can also be used as a tape brake. A particular feature of the cassette is that the spools 23, 24 can be rotated only with a cassette inserted. If the cassette is removed from the tape recorder, finely toothed latching means engage, thus rendering it impossible for the spools to be rotated outside the tape recorder. This ensures that the cassette is always reinserted into a tape recorder exactly in the same tape position in which it was previously removed.

Figure 3:
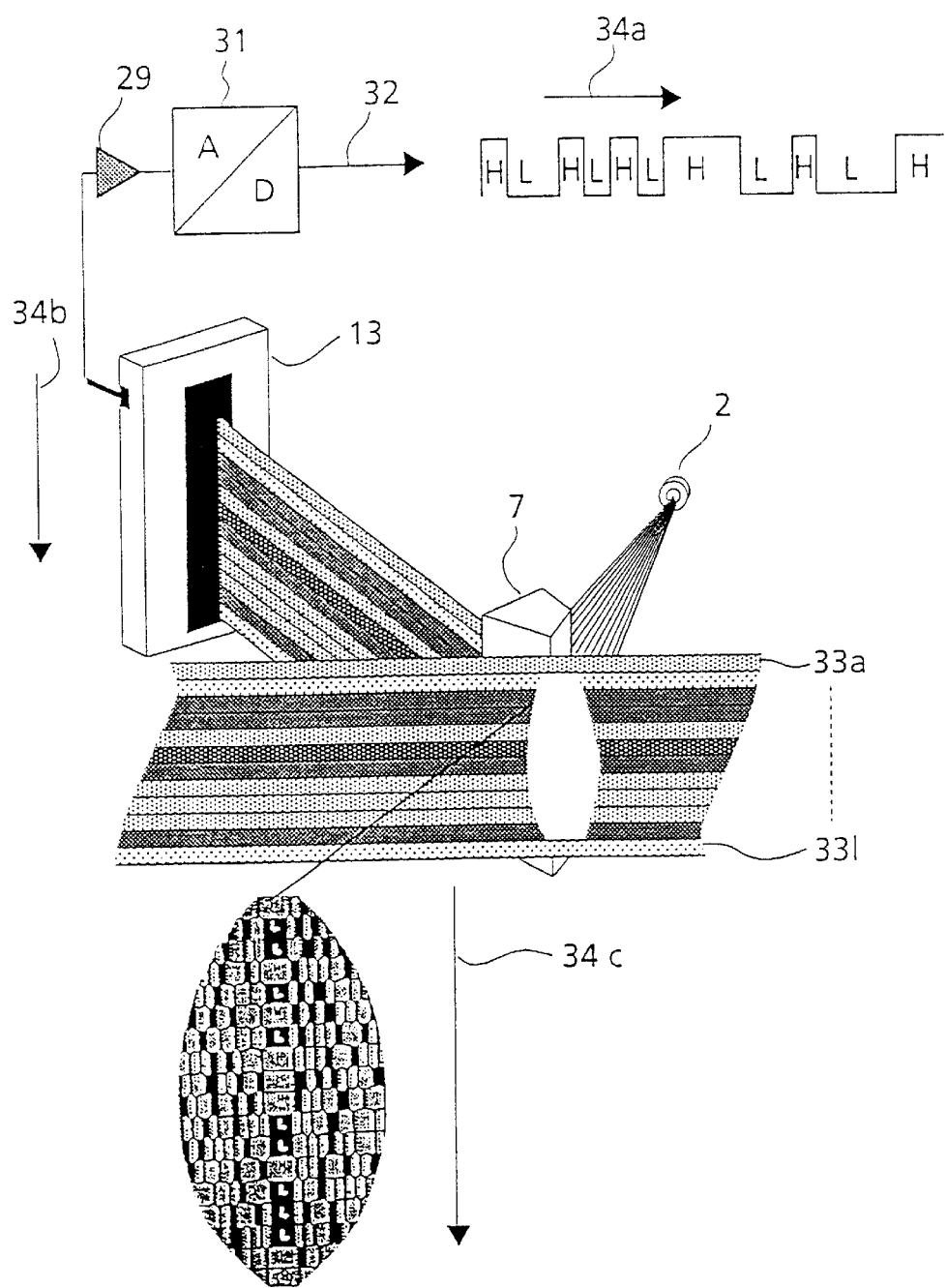
FIG. 3 shows a diagrammatic representation of the reading device in greater detail, including a segment of a track packet of the magnetic tape.

FIG. 3 shows the reading unit 1 in greater detail, some of the optical elements having been omitted for the sake of clarity. The light beam emerging from the laser diode 2 enters the magneto-optic transducer 7 and scans the entire width of the magnetic tape 8. The reflected light re-emerges from the magneto-optic transducer 7 and enters the CCD element 13, where it is converted into electric signals in accordance with its intensity. The electric signals are amplified in an amplifier 29 and converted into digital signals by means of an A/D converter 31 whose output 32 is connected to circuit means (not shown) The digital signals are further processed in a way known per se in said circuit means.

The data are recorded in individual data tracks 33a . . . 33l as longitudinal tracks of which a specific number, for example fourteen, are combined to form a track packet. Moreover, additional information which contains, for example, information on the state of the tape, is recorded in the direction perpendicular to the data tracks 33a . . . 33l and perpendicular to the longitudinal edge of the magnetic tape 8. Illustrated next to the output 32 of the A/D converter 31 is the respective signal level, which is assigned to the individual pixels of the linear CCD element 13. The arrows 34a, 34b specify the direction in which the signal levels are to be assigned to the pixels.

The vertically correlated data of the additional information can be seen clearly in the segment, represented in the lower region of FIG. 3, of a track packet. An arrow 34c specifies the direction on the magnetic tape 8 corresponding to the arrow 34b. Thus, all the information on the state of the tape can be read at a specific tape position by means of the magneto-optic transducer 7. The additional information is written over the entire width of the magnetic tape 8 with the exception of the two edge tracks 33a and 33l. The additional information is therefore represented in FIG. 4 as lines 35 running at right angles to the longitudinal edge of the magnetic tape 8 and extending virtually up to the edges of the magnetic tape 8.

The vertical structure of the additional information and the property of the magnetic tape cassette that the spools are locked outside the tape recorder permit the information on the state of the tape to be read immediately upon insertion of a cassette without the magnetic tape needing to be transported in one or other direction.

The further processing of the read data is now explained with the aid of the block diagram in FIG. 4.

After the signals output by the CCD element 13 have been converted into digital data by means of the A/D converter 31, a signal processor 36 detects whether these are data which are correlated in the vertical direction. The data correlated in the longitudinal track direction are reproduction data for which there is no vertical correlation. The reproduction data are output at an output 37 of the signal processor 36 and, for example, fed to decoding means. The data present in the vertical direction are fed from the signal processor 36 to a servo-control 39 via a second output 38. As soon as the signal processor 36 detects data correlated in the vertical direction, a state signal is output to the servo-control 39 at a third output 41. When the state signal is received by the servo-control 39, the latter interprets the data read in the vertical direction as additional information. Finally, the signal processor 36 monitors crosstalk components in neighbouring pixels. From the occurrence of such crosstalk components, the signal processor 36 detects that there is a maladjustment of the optical reading unit, and outputs a control signal at a fourth output 42 to the electromagnetic control means 15 which readjusts the track guidance plate 16 in such a way that the light reflected from in each case one data track impinges exactly on one pixel of the CCD element 13.

Via appropriate driver circuits, the servo-control 39 controls the motors for tape transport in the forwards and backwards directions, and the motors of the feed and take-up spools. For the sake of clarity, only one driver circuit 43 and only one motor 44 are represented as proxy for them all in FIG. 4. The servo-control 39 receives data from sensor means 46 which determine the speed of the respective motors. The data are used for the purpose of correcting the speed of the motors. Furthermore, sensor means 47 are provided for each spool 23, 24 in order to determine their speed. The measured values of the sensor means 46, 47 are amplified in an amplifier circuit 48 and fed to the servo-control 39. The clock with which the data are transmitted between the signal processor 36 and the servo-control 39 is generated in the servo-control 39 and transmitted to the signal processor 36 via a signal line 49. Finally, the servo-control 39 receives operating instructions of a user such as, for example, "playback", "search", "stop", "eject cassette", etc. at an input 51.

The tape recorder described so far functions in the following way:

In the playback mode of the tape recorder, the data recorded in longitudinal tracks in the data tracks 33a . . . 33l are output at the output 37 of the signal processor 36. Said data are further processed in suitable circuit means in a way known per se and played back, for example, as music. At the same time, the additional information 35 recorded in the vertical direction is also always output to the servo-control 39 via the output 38. Integrated in the servo-control 39 is a counter which reproduces the respective state of the tape. At the instant at which vertical additional information is detected, the counter reading is stored as datum Z1. The counter reading is stored a second time as datum Z2 when said additional information disappears again. If, for example, a stop instruction is now input by the user, the transport direction of the magnetic tape 8 is reversed, and the magnetic tape is transported back into a position in which the last vertical additional information was read. The return transport of the magnetic tape is typically achieved by a step operation of the respective drive motors. In this way, it is precisely that tape position which is situated between the two stored counter readings Z1 and Z2 which is approached. Said method has the advantage that a specific tape position is approached very precisely, and that the vertical additional information can be read effectively by the magneto-optic transducer 7.

In a modified embodiment, the magnetic tape is transported backwards only as far as the position at which the vertical additional information 35 can just be detected again, that is to say as far as a tape position which corresponds approximately to the counter reading Z2. If the cassette is to be taken out of the tape recorder, the spools are locked against rotation mechanically in advance. This takes place automatically and independently, for example owing to the fact that locking or latching means engage when, for example, a flap or a drawer is opened. It is ensured in this way that the magnetic tape is reinserted into the recorder ;n exactly the same position from which it was removed. Consequently, immediately after the cassette is inserted, the reading unit 1 is capable of reading information on the state of the tape without the need to transport the magnetic tape. It is expedient to select the toothing of the locking means to be so fine that the angle of rotation between neighbouring latched positions is smaller than the angle of rotation between the beginning and end of vertical information on a tape spool. It is also possible in principle to secure the spools against rotation by elements which engage with one another by frictional resistance. Such elements permit the spools to be retained in any desired rotational position.

In order to ensure that the magnetic tape is properly positioned on the write head 17 when recording data, provision is made for a pressure element 28 which presses the magnetic tape 8 against the write head 17 with a predetermined contact pressure.

What is claimed is:

1. Method for recording data on a magnetic tape comprising the following steps;

a) recording data in a plurality parallel data tracks arranged on the magnetic tape;

b) recording additional Information In a direction perpendicular to said data tracks, wherein portions of said additional information are recorded in different ones of said data tracks; and, c) alternating said steps a) and b) along the transport direction of the tape.

2. Method according to claim 1, wherein said data are recorded as digital signals in the data tracks, and pilot signals which serve to tune a reading unit are located in advance of the data.

3. Method according to claim 2, wherein said additional information is stored in a spatial region on the magnetic tape which is occupied by pilot signals in the individual data tracks.

4. Tape recorder having a reading device for reading a number of parallel data tracks on a magnetic tape extending at least partially in the longitudinal direction of the magnetic tape, the recorder comprising;
- a magneto optic transducer for reading the magnetic tape and detecting additional information stored on the magnetic tape in a vertical direction;
- a signal processor coupled to the magneto optic transducer for processing data signals read from the tape and generating a control signal indicative of the transducer sensing the additional information;
- a drive device for the magnetic tape;
- a control unit for controlling the drive device and responsive to the control signal, stopping the drive device only at positions where the magneto optic transducer senses the additional information stored on the magnetic tape in a vertical direction.

5. Tape recorder according to claim 4, wherein said magneto-optic transducer simultaneously senses a plurality of parallel data tracks.

6. Tape recorder according to claim 5, wherein said magneto-optic transducer senses all said additional information at specific positions on the magnetic tape.

7. Tape recorder for reading a number of parallel data tracks on a magnetic tape extending at least partially in the longitudinal direction of the magnetic tape, the recorder comprising;
- a reading device for reading the magnetic tape and detecting tape position information stored on the magnetic tape in a vertical direction;
- a signal processor coupled to the reading device for processing data signals read from the tape and generating a control signal indicative of the transducer sensing the tape position information;
- a drive device for the magnetic tape;
- a control unit responsive to the control signal for stopping the drive device only at tape positions having the tape position information stored in a vertical direction.

8. Tape recorder of claim 7, wherein said reading device reads said tape position information stored in a vertical direction on said tape when said tape is stationary.

* * * * *